_(12)_ United States Patent
Liu et al.

(10) Patent No.: US 11,116,002 B2
(45) Date of Patent: Sep. 7, 2021

(54) GAP CONFIGURATION FOR MULTIPLE TRANSPORT BLOCKS

(71) Applicant: QUALCOMM Incorporated, San Diego, CA (US)

(72) Inventors: Le Liu, Fremont, CA (US); Alberto Rico Alvarino, San Diego, CA (US); Raghavendra Shyam Ananda, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/784,803

(22) Filed: Feb. 7, 2020

(65) Prior Publication Data

US 2020/0267754 A1 Aug. 20, 2020

(30) Foreign Application Priority Data

Feb. 14, 2019 (IN) .............................. 201941005823

(51) Int. Cl.
*H04W 4/00* (2018.01)
*H04W 72/14* (2009.01)
(Continued)

(52) U.S. Cl.
CPC ........... *H04W 72/14* (2013.01); *H04L 5/1469* (2013.01); *H04W 8/24* (2013.01); *H04W 72/042* (2013.01);
(Continued)

(58) Field of Classification Search
None
See application file for complete search history.

(56) References Cited

U.S. PATENT DOCUMENTS

2017/0202008 A1* 7/2017 Nader ................... H04L 1/1896
2019/0045525 A1* 2/2019 Shi ..................... H04W 72/0493
2020/0314678 A1* 10/2020 Lee ....................... H04W 24/10

FOREIGN PATENT DOCUMENTS

WO 2018064583 A1 4/2018

OTHER PUBLICATIONS

International Search Report and Written Opinion—PCT/US2020/017544—ISA/EPO—dated Jun. 16, 2020.
(Continued)

*Primary Examiner* — Clemence S Han
(74) *Attorney, Agent, or Firm* — Harrity & Harrity, LLP; Nerrie M. Zohn

(57) ABSTRACT

Some techniques and apparatuses described herein provide for the determination of a gap for a scheduled communication involving multiple, different TBs. For example, some techniques and apparatuses described herein provide for the determination of a gap between two or more PDSCHs that are scheduled by a same DCI based at least in part on a UE capability, such as a processing time or a processing mode. Some techniques and apparatuses described herein provide for the determination of a gap between a last PDSCH and a next PDCCH based at least in part on the UE capability. The gap(s) may permit the UE to successfully receive and/or decode multiple PDSCHs and/or PDCCHs in view of the limitations imposed by the UE's processing time or processing mode. In this way, efficiency of PDSCH/PDCCH resource utilization may be improved, the likelihood of a failed PDCCH transmission is reduced, and network efficiency is improved.

30 Claims, 13 Drawing Sheets

(51) Int. Cl.
*H04W 72/04* (2009.01)
*H04W 72/12* (2009.01)
*H04W 76/27* (2018.01)
*H04L 5/14* (2006.01)
*H04W 8/24* (2009.01)

(52) U.S. Cl.
CPC ....... *H04W 72/1263* (2013.01); *H04W 76/27* (2018.02)

(56) References Cited

OTHER PUBLICATIONS

ZTE: "Considerations on Timing Relationship for 2 HARQ Processes for NB-IoT," 3GPP Draft, 3GPP TSG RAN WG1 Meeting #87, R1-1612600, Discussion on 2 Harq Processes, 3rd Generation Partnership Project (3GPP), Mobile Competence Centre, 650, Route Des Lucioles, F-06921, Sophia-Antipolis Cedex, France, vol. RAN WG1. No. Reno. USA; Nov. 14, 2016-Nov. 18, 2016, Nov. 13, 2016 (Nov. 13, 2016), XP051176545, 5 pages, Retrieved from the Internet: URL: http://www.3gpp.org/ftp/Meetings_3GPP_SYNC/RAN1/Docs/ [retrieved on Nov. 13, 2016].

* cited by examiner

GAP CONFIGURATION FOR MULTIPLE TRANSPORT BLOCKS

CROSS-REFERENCE TO RELATED APPLICATION

This Patent Application claims priority to Indian Provisional Patent Application No. 201941005823, filed on Feb. 14, 2019, entitled "GAP CONFIGURATION FOR MULTIPLE TRANSPORT BLOCKS," and assigned to the assignee hereof. The disclosure of the prior Application is considered part of and is incorporated by reference in this Patent Application.

BACKGROUND

Field

Aspects of the present disclosure generally relate to wireless communication, and to techniques and apparatuses for gap configuration for multiple transport blocks (TBs).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

Downlink control information (DCI) may carry scheduling information (e.g., a physical downlink control channel (PDCCH), a narrowband PDCCH (NPDCCH), and/or the like) for a shared channel or data channel, such as a physical downlink shared channel (PDSCH) or a narrowband PDSCH (NPDSCH). The shared channel or data channel may be provided using transport blocks (TBs). In some cases, DCI may carry scheduling information for multiple, different shared channels or TBs, such as for single-cell point-to-multipoint and/or the like. For example, in certain coverage enhancement (CE) modes, the maximum number of scheduled transport blocks of a single DCI may be 8 in the uplink and 8 in the downlink, 4 in the uplink and 4 in the downlink, and/or the like. Furthermore, for some technologies, such as uplink or downlink unicast, a consecutive resource allocation in time may be supported, meaning that there may be no predefined gap between the end of a first TB and the start of a second TB. In some cases, the scheduling of multiple TBs (e.g., multiple TBs using a single DCI, multiple consecutive TBs, and/or the like) may overwhelm the processing capabilities of the UE. For example, for data detection processing, the UE may require processing time for each PDSCH, or may require a certain amount of processing time between a last PDSCH and a next PDCCH (e.g., DCI) to be received by the UE. This processing time may be dependent on a UE capability, or in some cases, may be 10 milliseconds (ms) or more.

Some techniques and apparatuses described herein provide for the determination of a gap for a scheduled communication involving multiple, different TBs. For example, some techniques and apparatuses described herein provide for the determination of a gap between two or more PDSCHs that are scheduled by a same DCI based at least in part on a UE capability, such as a processing time or a processing mode. Some techniques and apparatuses described herein provide for the determination of a gap between a last PDSCH and a next PDCCH based at least in part on the UE capability. The gap(s) may permit the UE to successfully receive and/or decode multiple PDSCHs and/or PDCCHs in view of the limitations imposed by the UE's processing time or processing mode. In this way, efficiency of PDSCH/PDCCH resource utilization may be improved, the likelihood of a failed PDCCH transmission is reduced, and network efficiency is improved.

In an aspect of the disclosure, a method, a UE, a base station, an apparatus, and a computer program product are provided.

In some aspects, the method may by performed by a UE. The method may include receiving control information that includes grants for two or more data transmissions; determining a gap for the two or more data transmissions based at least in part on at least one of a processing mode, a processing time of the UE, or a transmission time per data transmission the two or more data transmissions; and receiving the two or more data transmissions in accordance with the gap.

In some aspects, the UE may include a memory and one or more processors operatively coupled to the memory. The memory and the one or more processors may be configured to receive control information that includes grants for two or more data transmissions; determine a gap for the two or more data transmissions based at least in part on at least one of a processing mode, a processing time of the UE, or a transmission time per data transmission the two or more data transmissions; and receive the two or more data transmissions in accordance with the gap.

In some aspects, the apparatus may include means for receiving control information that includes grants for two or more data transmissions; means for determining a gap for the two or more data transmissions based at least in part on a processing mode or a processing time of the apparatus for the two or more data transmissions; and means for receiving the two or more data transmissions in accordance with the gap.

In some aspects, the computer program product may include a non-transitory computer-readable medium storing one or more instructions. The one or more instructions, when executed by one or more processors of a UE, may cause the one or more processors to receive control information that includes grants for two or more data transmissions; determine a gap for the two or more data transmissions based at least in part on at least one of a processing mode, a processing time of the UE, or a transmission time per data transmission the two or more data transmissions; and receive the two or more data transmissions in accordance with the gap.

In some aspects, the method may by performed by a base station. The method may include transmitting control information that includes grants for two or more data transmissions; and transmitting the two or more data transmissions in accordance with a gap for the two or more data transmissions, wherein the gap is based at least in part on at least one of a processing mode, a processing time of a recipient, or a transmission time per data transmission of the two or more data transmissions.

In some aspects, the base station may include a memory and one or more processors operatively coupled to the memory. The memory and the one or more processors may be configured to transmit control information that includes grants for two or more data transmissions; and transmit the two or more data transmissions in accordance with a gap for the two or more data transmissions, wherein the gap is based at least in part on at least one of a processing mode, a processing time of a recipient, or a transmission time per data transmission of the two or more data transmissions.

In some aspects, the apparatus may include means for transmitting control information that includes grants for two or more data transmissions; and transmitting the two or more data transmissions in accordance with a gap for the two or more data transmissions, wherein the gap is based at least in part on at least one of a processing mode, a processing time of a recipient, or a transmission time per data transmission of the two or more data transmissions.

In some aspects, the computer program product may include a non-transitory computer-readable medium storing one or more instructions. The one or more instructions, when executed by one or more processors of a base station, may cause the one or more processors to transmit control information that includes grants for two or more data transmissions; and transmit the two or more data transmissions in accordance with a gap for the two or more data transmissions, wherein the gap is based at least in part on at least one of a processing mode, a processing time of a recipient, or a transmission time per data transmission of the two or more data transmissions.

Aspects generally include a method, apparatus, system, computer program product, non-transitory computer-readable medium, user equipment, base station, wireless communication device, and processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
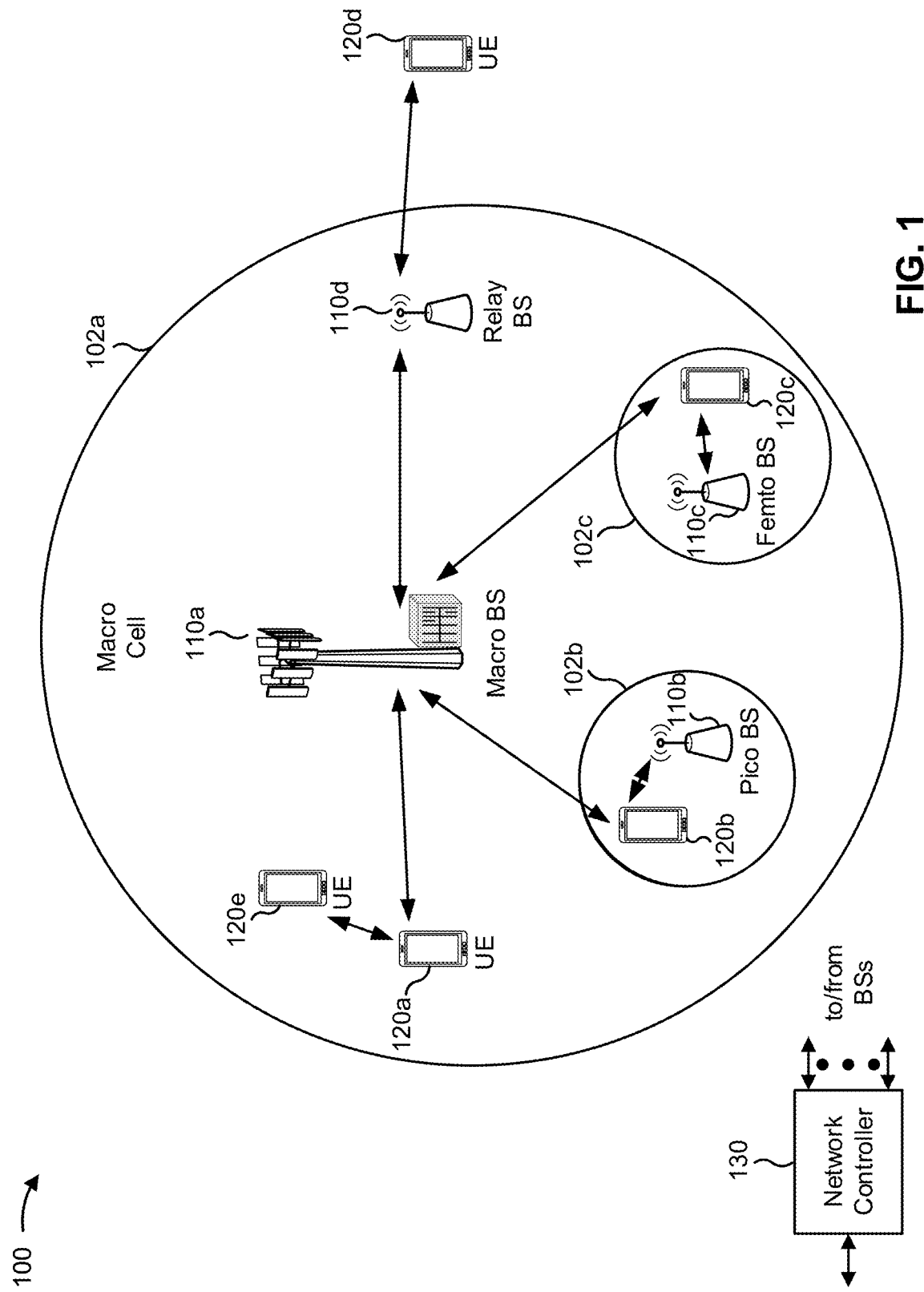
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. NB-IoT devices, MTC devices, and/or the like may use various coverage enhancement (CE) modes to improve coverage, such as CE Mode A, CE Mode B, and/or the like. Some of these CE modes may use DCI that schedules multiple TBs. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
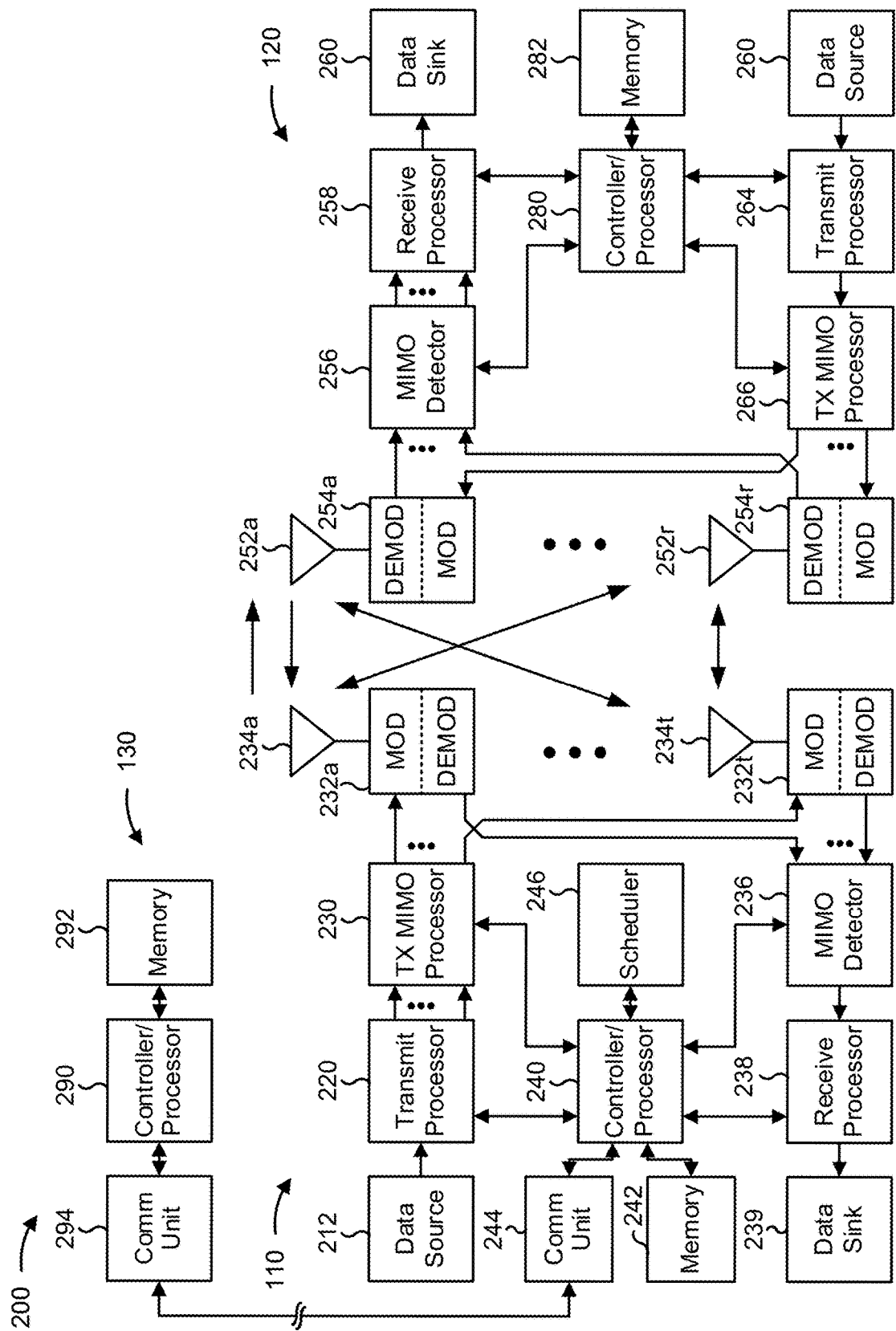
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. In some aspects, one or more components of UE 120 may buffer downlink data (e.g., a PDSCH, an NPDSCH, and/or the like) for processing. In such a case, UE 120 may be associated with a buffer size, a processing time, and/or the like for the buffered data. A channel processor may determine reference signal received power (RSRP, received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with gap determination for multiple TBs, as described in more detail elsewhere herein. For example, controller/processor 240 of base station 110, controller/processor 280 of UE 120, and/or any other component(s) of FIG. 2 may perform or direct operations of, for example, method 800 of FIG. 8, method 1100 of FIG. 11, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

Figure 3:
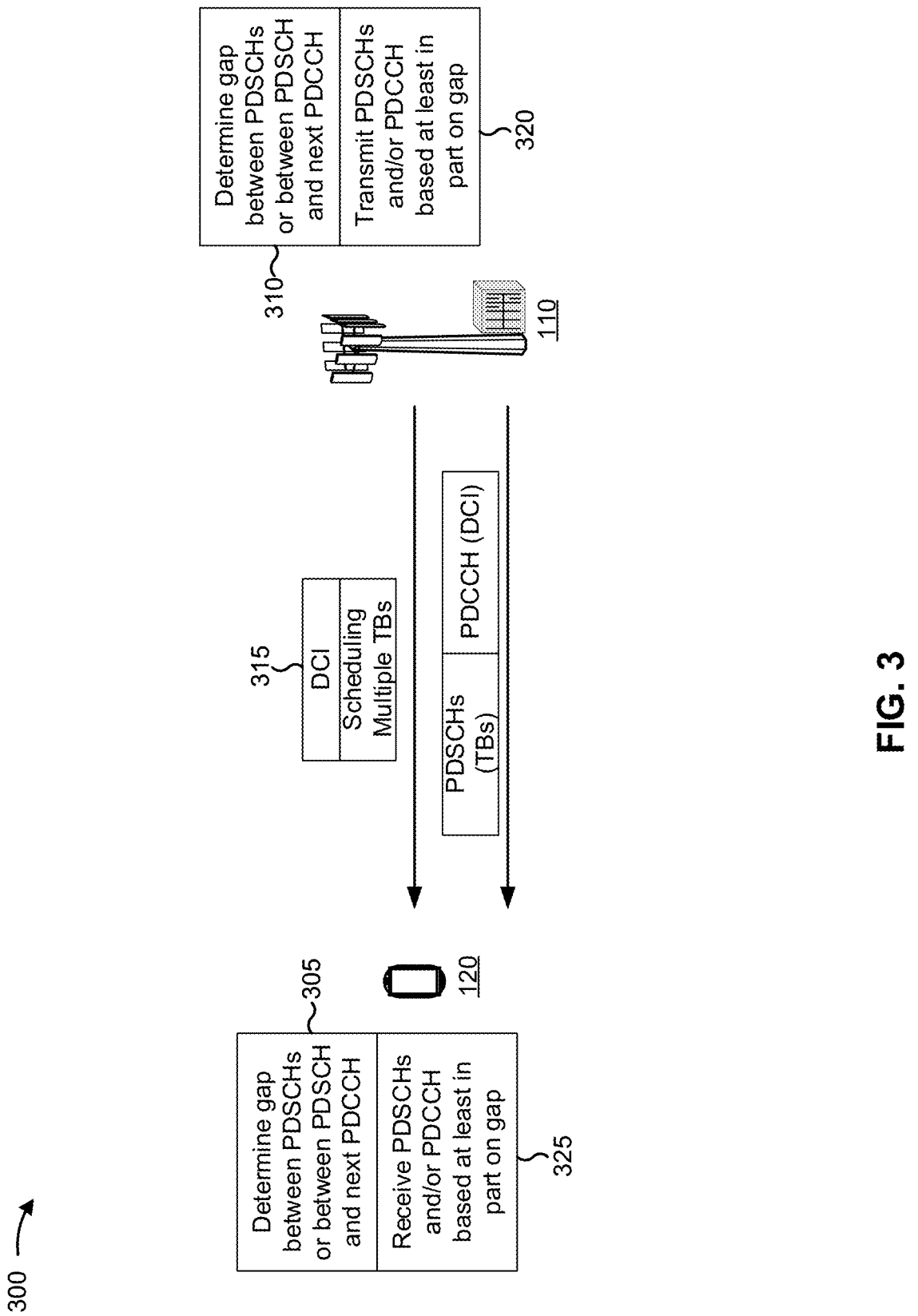
FIG. 3 is a diagram illustrating an example of determination of a gap for a multi-TB communication.

FIG. 3 is a diagram illustrating an example 300 of determination of a gap for a multi-TB communication. As shown, FIG. 3 includes a UE 120 and a BS 110. In some aspects, the UE 120 may be an MTC UE, an eMTC UE, an NB-IoT UE, and/or the like, although the aspects described herein are not limited to these types of UEs.

As shown by reference numbers 305 and 310, the UE 120 and the BS 110 may determine a gap between multiple PDSCHs of a communication (referred to in some cases as Gap1) and/or a gap between a last PDSCH of a communication and a PDCCH of a next communication (referred to in some cases as Gap2). For example, the gaps described herein may provide for a minimum spacing (e.g., a minimum time spacing, a minimum number of subframes, and/or the like) between two PDSCHs and/or between a last PDSCH and a next PDCCH. In some aspects, the BS 110 and/or the UE 120 may determine the gap(s) to be used for the multiple PDSCHs before scheduling the multiple PDSCHs, and may schedule or receive the multiple PDSCHs in accordance with the gap(s). In some aspects, the BS 110 may transmit scheduling information for multiple PDSCHs based at least in part on a gap, and the UE 120 may determine the gap based at least in part on the scheduling information and/or a capability of the UE (e.g., a processing time, a processing mode, a transmission time per data transmission, and/or the like). In other words, the UE 120 may determine the gap before receiving the DCI or after receiving the DCI. Example techniques for determining the gaps are described elsewhere herein (e.g., in connection with FIGS. 4-7).

In some aspects, the UE 120 may provide information identifying a capability or configuration of the UE 120. For example, the UE 120 may provide information identifying a processing time (e.g., a processing time to decode or receive a PDSCH before a next PDSCH is received), a processing mode (e.g., a batch processing mode wherein a first PDSCH is buffered while a second PDSCH is decoded, a real time mode wherein PDSCHs are decoded as received without buffering), a time division duplexing (TDD) downlink/uplink (DL/UL) configuration (e.g., indicating a ratio of downlink to uplink subframes for the UE 120), a maximum buffer size of the UE 120, a transmission time per data transmission (e.g., a number of subframes per PDSCH, which may be determined based at least in part on a number of repetitions or a number of allocated resource units for the PDSCH(s)), and/or the like. The BS 110 may use this information to determine a gap and/or to select a gap configuration to be used by the UE 120 (e.g., a gap configuration for a batch processing mode, a gap configuration for a real time mode, and/or the like).

In some aspects, the UE 120 may receive information indicating the gap and/or a gap configuration. For example, the BS 110 may provide information indicating the gap and/or the gap configuration (e.g., radio resource control (RRC) information, DCI, and/or the like). The UE 120 may determine the gap in accordance with this information, or may determine the gap in accordance with a gap configuration indicated by this information.

In some aspects, the UE 120 may select a gap configuration in accordance with a processing mode of the UE 120. For example, the UE 120 may select a gap configuration for a batch processing mode or a real time mode based at least in part on whether the UE 120 is associated with the batch processing mode or the real time mode. As another example, the UE 120 may select a gap configuration based at least in part on a number of scheduled TBs (shown as X below), a TB size (shown as T below), a number of repetitions (shown as R below), a number of allocated resource units (shown as $N_{RU}$ below), and/or the like. As more particular examples, for a PDSCH length of N and a processing time of $N_0$, one or more of the following example techniques may be used to select the gap configuration and/or the processing mode:

i. If X=2, use batch processing and Gap1=0, Gap2=max$\{2N_0-N, N_0\}$; otherwise, use real time processing and Gap1=max$\{N_0-N, 0\}$, Gap2=$N_0$.

ii. If X*T<=2*Tmax, use batch processing and Gap1=0, Gap2=max$\{X*N_0-(X-1)N, N_0\}$; otherwise, use real time processing and Gap1=max$\{N_0-N, 0\}$, Gap2=$N_0$.

iii. If the total number of subframes N=R*$N_{RU}$<$N_0$, use batch processing and Gap1=0, Gap2=$2N_0$-N; otherwise, use Gap1=$N_0$-N, Gap2=$N_0$.

In the above examples, Gap1 refers to a gap between a first PDSCH and a second PDSCH, and Gap2 refers to a gap between a last PDSCH and a next PDCCH.

As shown by reference number 315, the BS 110 may provide downlink control information (DCI). For example, the BS 110 may provide the DCI in a PDCCH. As further shown, the DCI may include information scheduling multiple TBs for the UE 120. For example, the DCI may schedule multiple PDSCHs for the UE 120 that are to be provided using multiple transport blocks. In some aspects, the scheduling information may be configured based at least in part on the gaps described above. For example, the scheduling information may provide for gaps between the PDSCHs and/or between a last PDSCH and a next PDCCH in accordance with corresponding gaps. In some aspects, the UE 120 may be responsible for determining the gaps. For example, the UE 120 may receive DCI indicating that multiple PDSCHs are to be received, and may determine the gaps to be used to receive the multiple PDSCHs.

In some aspects, the multiple PDSCHs may be scheduled consecutively. For example, in some cases, the UE 120 may be associated with a processing mode indicating that the UE 120 can buffer one or more PDSCHs while decoding another PDSCH. In such a case, the multiple PDSCHs may be scheduled consecutively, or may be schedule so that the decoding of one PDSCH partially overlaps the reception of another PDSCH.

As shown by reference number 320, the BS 110 may transmit the PDSCHs (e.g., with respective TBs) and/or a next PDCCH (e.g., with a next DCI) based at least in part on the gap(s) determined in connection with reference numbers 305 and 310, above. For example, the BS 110 may transmit the PDSCHs and/or the next PDCCH in accordance with one or more of the gap configurations described in more detail in connection with FIGS. 4-7, below. As shown by reference number 325, the UE 120 may receive the PDSCHs and/or the next PDCCH based at least in part on the gap(s) described above. In this way, the BS 110 may provide adequate time for the UE 120 to decode consecutive and/or multi-PDSCH communications, thereby improving network efficiency and reducing dropped or unsuccessful downlink communications. Otherwise, if the time between the last NPDSCH and next PDCCH (first candidate in search space) is not sufficient, the UE can skip decoding that PDCCH candidate.

As indicated above, FIG. 3 is provided as an example. Other examples may differ from what is described with respect to FIG. 3.

FIGS. 4-7 are diagrams illustrating examples 400, 500, 600, and 700 of gap configurations for multi-TB communications. In FIGS. 4-7, PDCCHs for respective sets of PDSCHs are typically shown to the left of the respective sets of PDSCHs, except where there is not room to show the PDCCH. The PDSCHs and PDCCHs described in connection with FIGS. 4-7 may include NPDSCHs, NPDCCHs, and/or the like.

Figure 4:
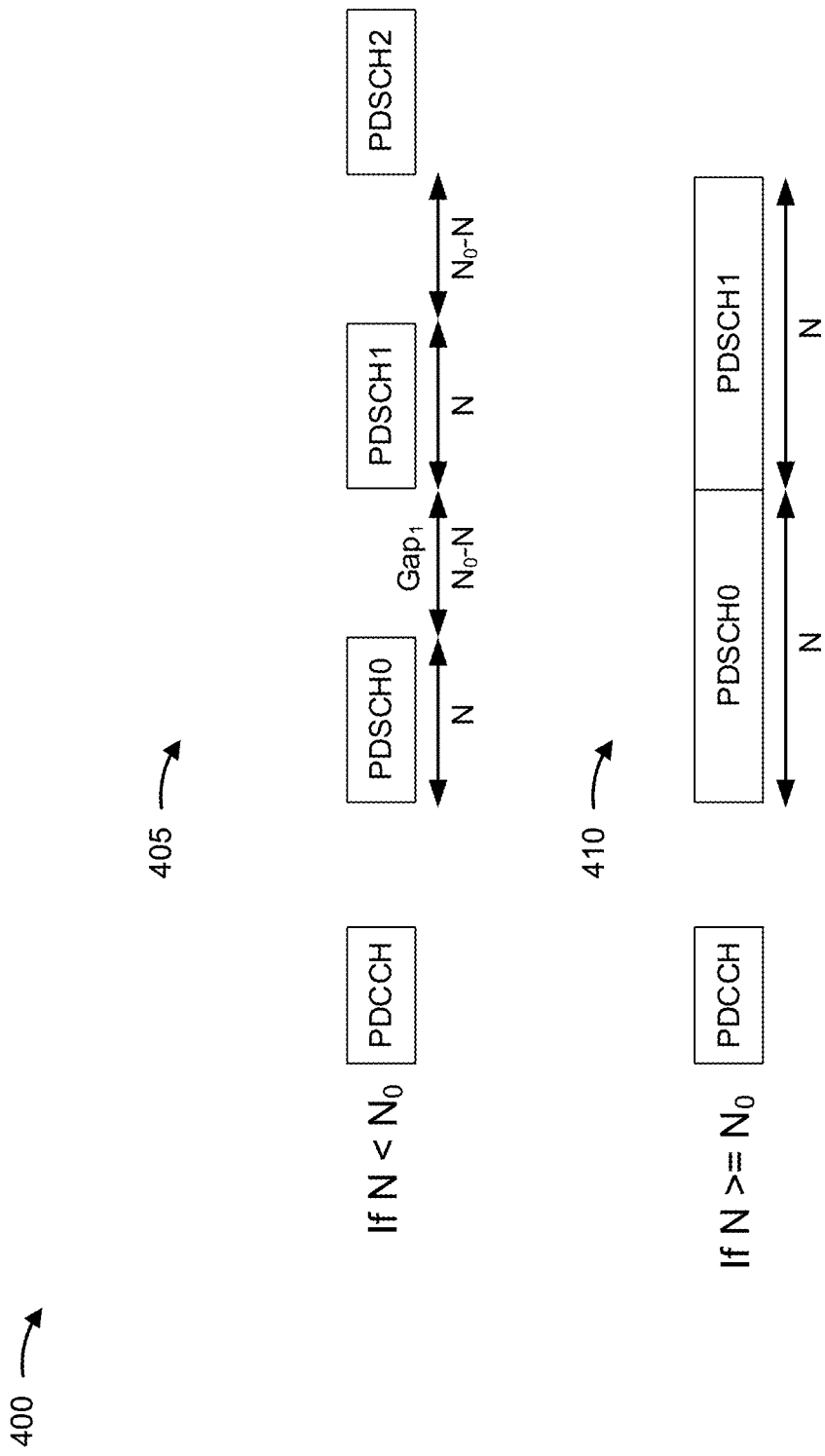
FIGS. 4-7 are diagrams illustrating examples of gap configurations for multi-TB communications.

FIG. 4 shows a first example 405 for the case when N (e.g., the length of a PDSCH) is shorter than $N_0$ (e.g., the processing time of the UE 120 for a PDSCH). As shown by first example 405, in such a case, Gap1 (e.g., the gap between PDSCHs) may use a value $N_0-N$ so that the minimum processing time $N_0$ is provided for each PDSCH. Furthermore, FIG. 4 shows a second example 410 for the case when N is longer than or equal to $N_0$. As shown by second example 410, in such a case, Gap1 may use a value N, since the minimum processing time $N_0$ will be satisfied by the value N. Thus, in example 400, Gap1 may be defined as Gap1=max($N_0-N$,0). In FIG. 4, and in the other examples described herein, $N_0$ may be predefined or preconfigured (e.g., specified in a standard, specified as a UE capability, and/or the like), or may be configured (e.g., RRC configured and/or the like) based at least in part on a UE capability, such as the UE 120's required processing time.

Figure 5:
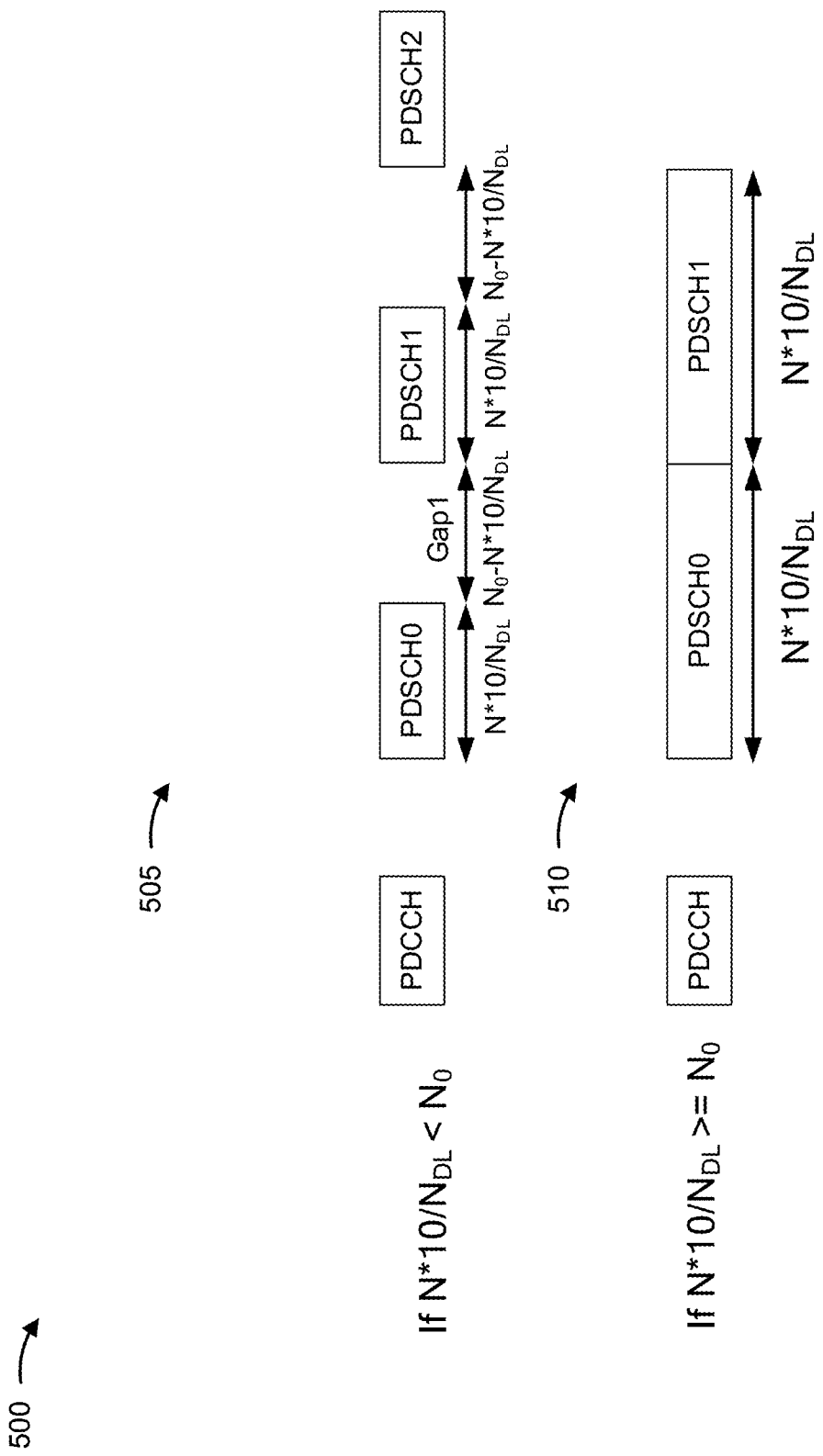

FIG. 5 shows examples 505, 510 for a TDD configuration, such as an NB-IoT TDD configuration. First example 505 and second example 510 take into account a TDD DL/UL ratio (e.g., NAL, which may define a number of DL subframes per radio frame, wherein there may be 10 total subframes per radio frame and $N_{DL}=1\sim10$) of the UE 120, which may define the ratio of downlink to uplink and special frames of the UE 120. By scaling the value of N in accordance with the TDD DL/UL ratio, the UE 120 and/or the BS 110 may determine an appropriate gap for the TDD configuration. First example 505 is an example wherein the scaled value of N (e.g., $N*10/N_{DL}$) is less than $N_0$. As shown in first example 505, in such a case, the UE 120 may determine a Gap1 value of $N_0-N*10/N_{DL}$. Thus, adequate processing time of the UE 120 is provided for PDSCHs scheduled by a same PDCCH. Second example 510 is an example wherein the scaled value of N is greater than or equal to $N_0$. As shown, in such a case, the UE 120 may determine a Gap1 value of $N*10/N_{DL}$. Thus, in example 500, Gap1 may be defined as Gap1=max($N_0-N*10/N_{DL}$,0).

Figure 6:
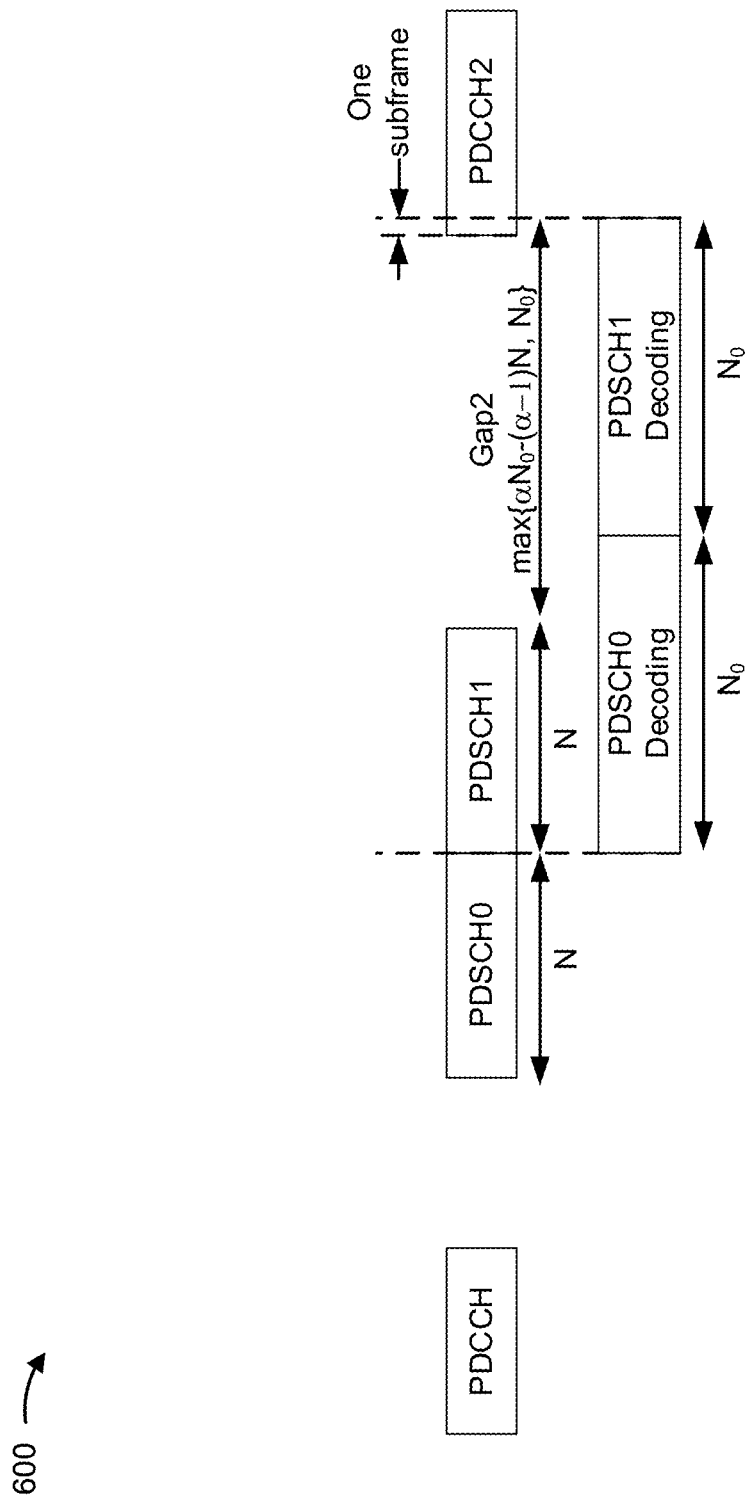

FIG. 6 shows an example 600 of determination of a gap between a last PDSCH and a next PDCCH, shown as Gap2. For example, example 600 may relate to a batch processing mode, wherein two or more consecutive PDSCHs are to be processed by the UE 120. In FIG. 6, α refers to a maximum number of consecutive PDSCHs that can be processed in the batch processing mode, which means the UE can process the decoding of one PDSCH while buffering (α−1) PDSCH(s). For example, in example 600, α may be equal to 2. In a real time processing mode, α may be equal to 1. As shown, in the case when a length of a PDSCH (N) is less than a length of $N_0$, the UE 120 may determine Gap2 as $\alpha N_0-(\alpha-1)N$, or, in the case when α=2, $2*N_0-1*N$. Thus, the UE 120 may ensure that both PDSCHs can be decoded (by providing two times the required decoding time $N_0$ minus the time length of the buffered PDSCH) before a next PDCCH is received. Otherwise, when N is no less than a length of $N_0$, Gap2 is equal to $N_0$ and there is no Gap1 in between PDSCHs, which is similar to real time processing. In some cases, the UE 120 may determine Gap2 based at least in part on an end of PDCCH. In some cases, as shown, the UE 120 may determine Gap2 based at least in part on an end of a first subframe of the PDCCH. For example, the UE 120 may determine Gap2 as between the end of the last PDSCH and the end of the first subframe of the PDCCH based at least in part on an assumption of potential early termination of the decoding operation. As used in FIGS. 6 and 7, the PDCCH may refer to a control transmission candidate of a search space for the PDCCH. For example, "PDCCH" and "control transmission candidate of a search space for a PDCCH" may be used interchangeably herein.

Figure 7:
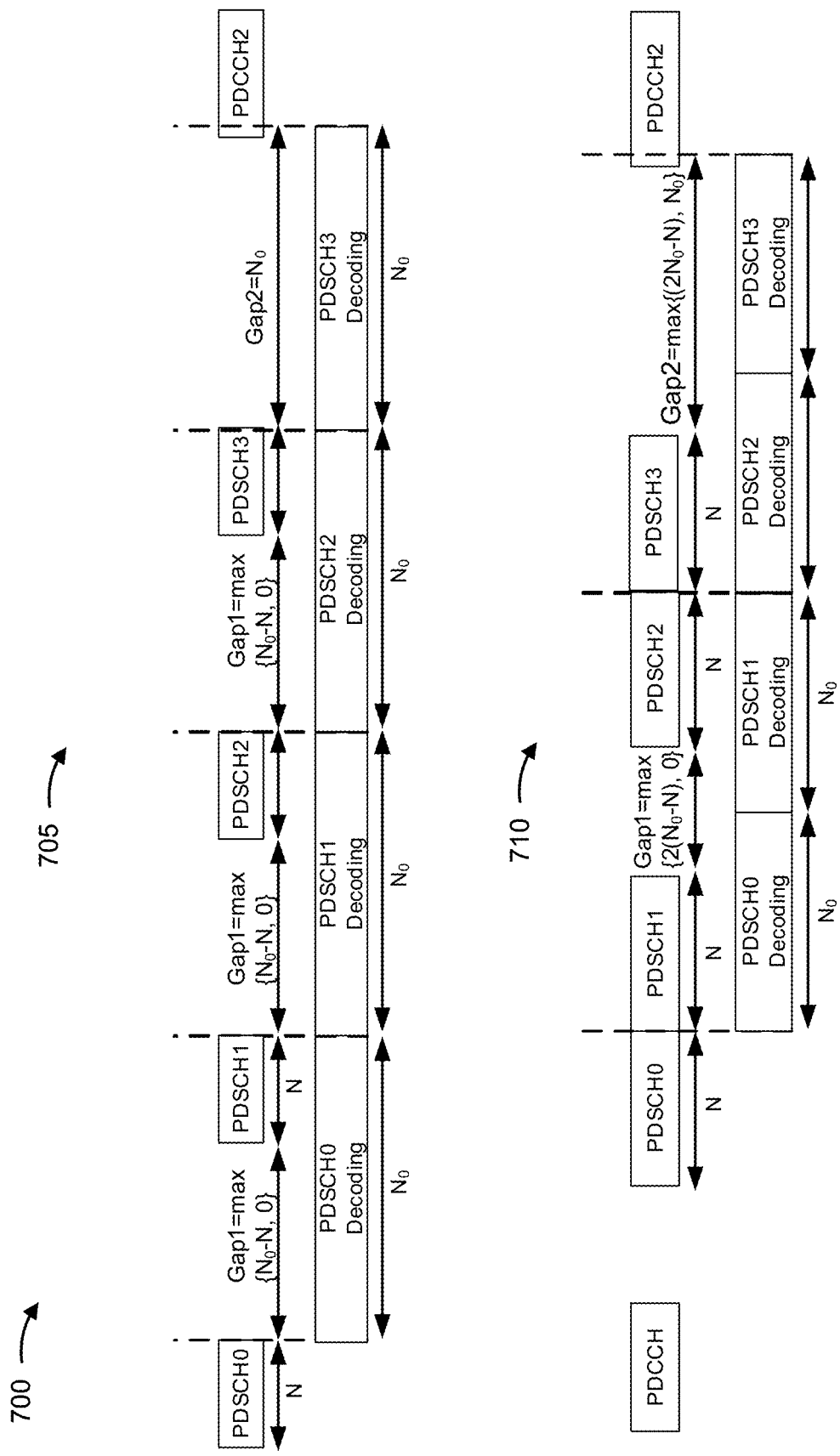

FIG. 7 shows examples 705 and 710 that combine Gap1 and Gap2 for a real time processing mode, as shown by first example 705, and a batch processing mode, as shown by second example 710. In first example 705, the real time processing mode is used, so the PDSCHs are not received consecutively. As further shown, a Gap1 value of Gap1=max{$N_0-N$, 0} is used between each PDSCH. Furthermore, since Gap2 may be equal to max{$\alpha N_0-(\alpha-1)N$, $N_0$}, and since $N_0$ is greater than N, UE 120 may use $N_0$ for Gap2. In second example 710, batch processing may be performed with α=2, however, there are α*X TBs in total triggered by one DCI. In this case, as shown, there are X PDSCH groups and α PDSCHs per group. Gap1=max{α($N_0-N$), 0} is needed between PDSCH groups but α PDSCHs are consecutive in each group. For the distance between the last PDSCH and next PDCCH, Gap2=max{($\alpha N_0-(\alpha-1)N$), $N_0$}. Thus, a combination of Gap1 and Gap2 may be used to improve downlink performance of UE 120 and reduce the occurrence of dropped or ignored PDCCHs or PDSCHs.

As indicated above, FIGS. 4-7 are provided as one or more examples. Other examples may differ from what is described with respect to FIGS. 4-7.

Figure 8:
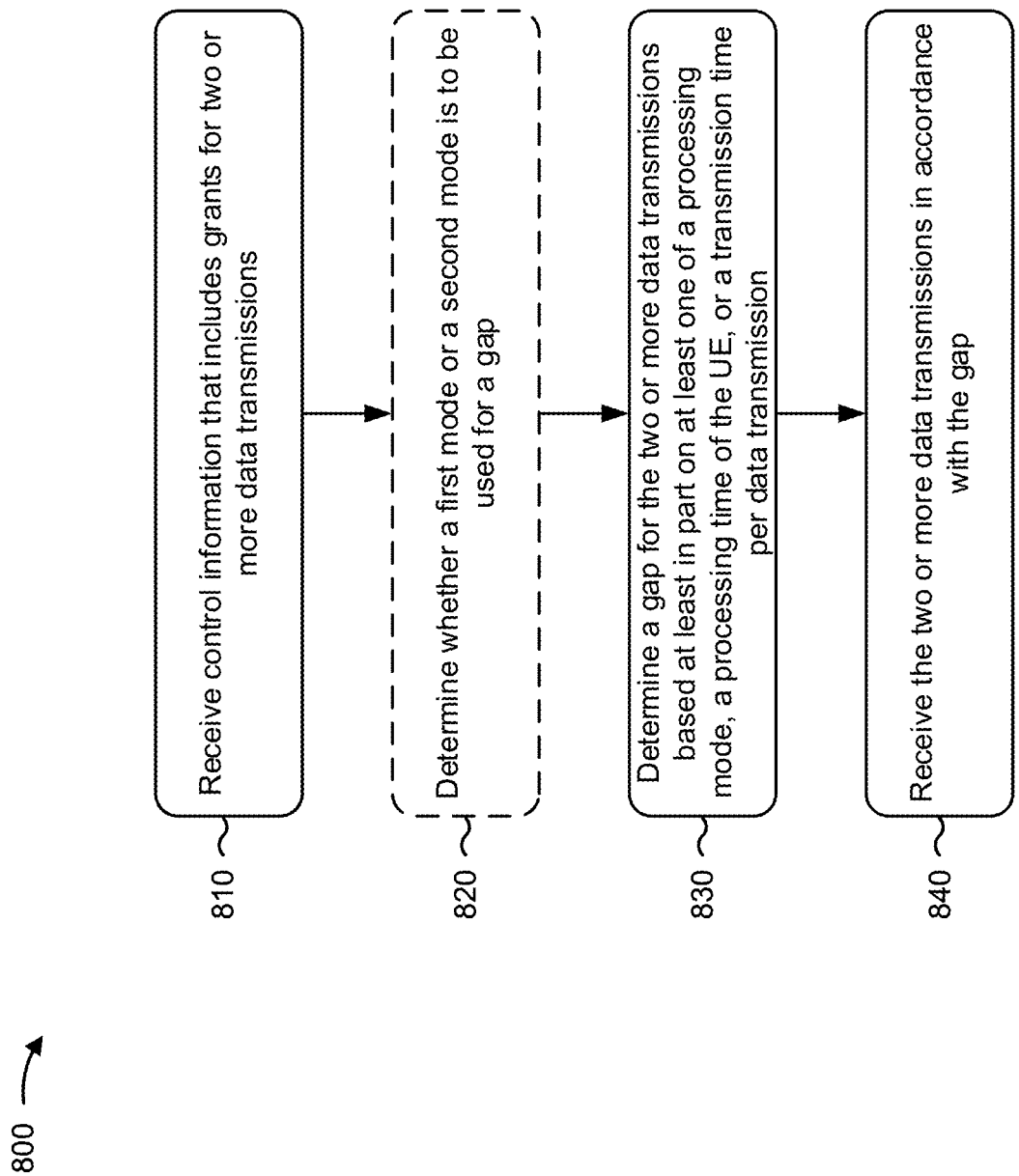
FIG. 8 is a flow chart of a method of wireless communication.

FIG. 8 is a flow chart of a method 800 of wireless communication. The method may be performed by a user equipment (e.g., the UE 120 of FIG. 1, the apparatus 902/902' of FIGS. 9 and 10, and/or the like). Dotted lines may indicate optional steps.

At 810, the user equipment may receive control information that includes grants for two or more data transmissions. For example, the user equipment (e.g., using antenna 252, DEMOD 254, MIMO detector 256, receive processor 258, controller/processor 280, and/or the like) may receive control information, such as a DCI, a PDCCH, and/or the like. The control information may include grants for two or more data transmissions. For example, the control information may include scheduling information for the two or more data transmissions. In some aspects, the two or more data transmissions are consecutive with each other (e.g., in a batch processing mode). For example, the two or more data transmissions may comprise pairs of data transmissions separated by a gap between each pair of data transmissions.

At 820, the user equipment may determine whether a first mode or a second mode is to be used for a gap. For example, the UE (e.g., using controller/processor 280 and/or the like) may determine whether a first mode or a second mode (or both) is to be used for the gap. The gap (e.g., Gap1) may be provided between data transmissions of the two or more data transmissions in the first mode. The gap (e.g., Gap2) may be provided between a last data transmission of the two or more transmissions and subsequent control information in the second mode. In some aspects, determining whether the first mode or the second mode is to be used is based at least in part on control information or radio resource control signaling indicating whether the first mode or the second mode is to be used. In some aspects, determining whether the first mode or the second mode is to be used is based at least in part on at least one of a number of scheduled data transmissions of the two or more data transmissions, a transport block size of the two or more data transmissions, a number of repetitions of the two or more data transmissions, or a number of allocated resource units for the two or more data transmissions. In some aspects, the gap is between a first pair of data transmissions, of the two or more data transmissions, and a second pair of data transmissions, of the two or more data transmissions.

At 830, the user equipment may determine a gap for the two or more data transmissions based at least in part on at least one of a processing mode, a processing time of the UE, or a transmission time per data transmission. For example, the UE (e.g., using controller/processor 280 and/or the like) may determine a gap (e.g., Gap1 and/or Gap2) for the two or more transmissions. The UE may determine the gap based at least in part on a processing mode (e.g., a batch processing mode or a real time processing mode), a processing time (e.g., $N_O$) of the UE, or a transmission time per data transmission (e.g., R). In some aspects, the gap is between an end of a first data transmission, of the two or more data transmissions, and a start of a second data transmission of the two or more data transmissions. In some aspects, the gap is based at least in part on a length of a data transmission of the two or more data transmissions. In some aspects, the length of the data transmission is based at least in part on a time division duplexing (TDD) downlink/uplink (DL/UL) configuration of the UE. In some aspects, the processing time is predefined. In some aspects, the processing mode is predefined. In some aspects, the processing mode or the processing time is radio resource control configured based at least in part on a capability of the UE.

In some aspects, the gap is between an end of a last data transmission, of the two or more data transmissions, and an end of a control transmission candidate of a search space for a next data transmission. In some aspects, the gap is between an end of a last data transmission, of the two or more data transmissions, and an end of a first subframe of a control transmission candidate of a search space for a next data transmission.

In some aspects, the processing mode indicates to buffer one or more second data transmissions of the two or more data transmissions while a first data transmission of the two or more data transmissions is decoded. In some aspects, the processing mode indicates not to buffer one or more second data transmissions of the two or more data transmissions while a first data transmission of the two or more data transmissions is decoded. In some aspects, a size of the gap is based at least in part on a buffer size of the UE. In some aspects, a size of the gap is based at least in part on a transport block size of the two or more data transmissions.

At 840, the user equipment may receive the two or more data transmissions in accordance with the gap. For example, the user equipment (e.g., using antenna 252, DEMOD 254, MIMO detector 256, receive processor 258, controller/processor 280, and/or the like) may receive the two or more data transmissions in accordance with Gap1 and/or Gap2.

Although FIG. 8 shows example blocks of a method of wireless communication, in some aspects, the method may include additional blocks, fewer blocks, different blocks, or differently arranged blocks than those shown in FIG. 8. Additionally, or alternatively, two or more blocks shown in FIG. 8 may be performed in parallel.

Figure 9:
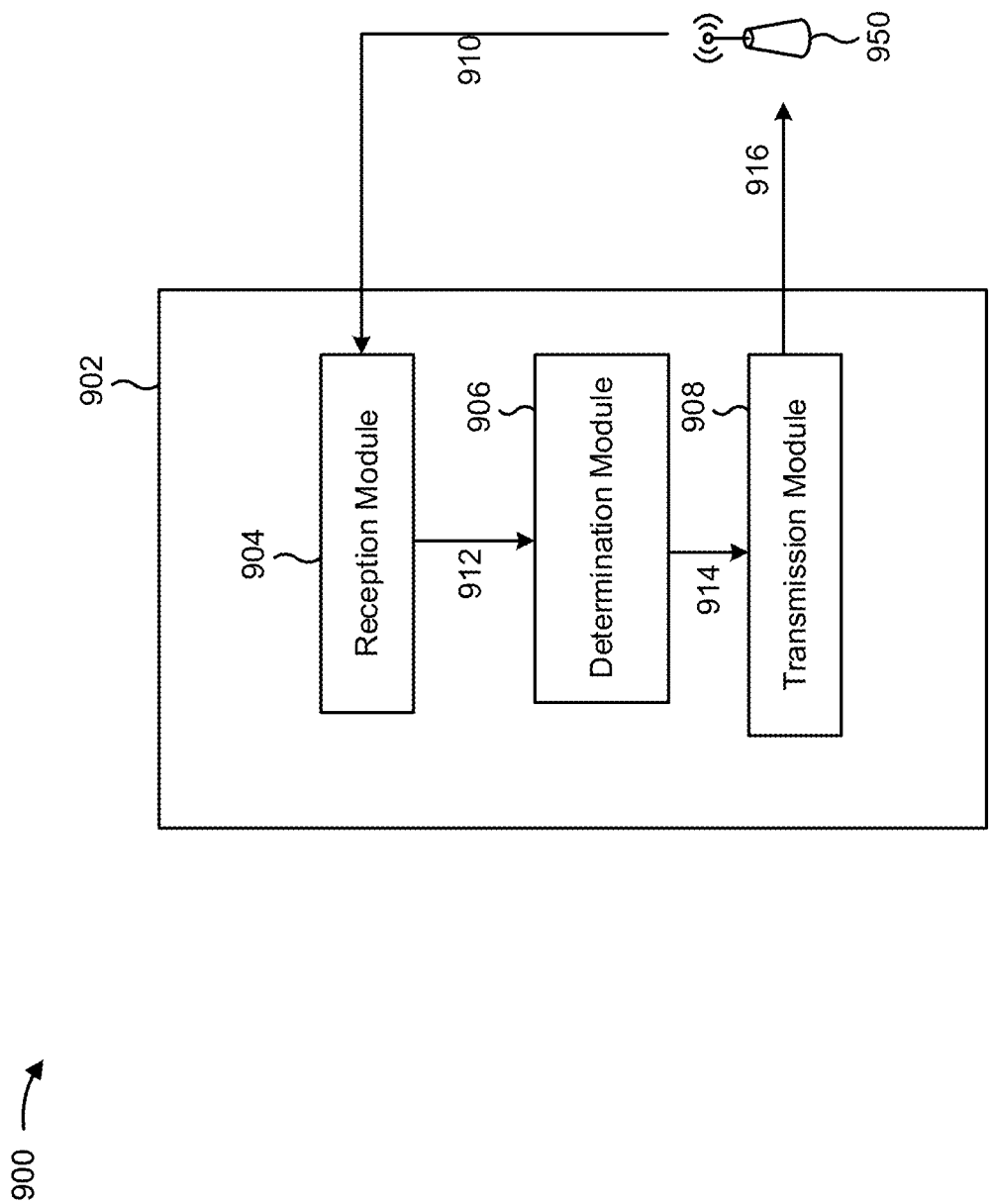
FIG. 9 is a conceptual data flow diagram illustrating a data flow between different modules/means/components in an example apparatus.

FIG. 9 is a conceptual data flow diagram 900 illustrating a data flow between different modules/means/components in an example apparatus 902. The apparatus 902 may be a UE. In some aspects, the apparatus 902 includes a reception module 904, a determining module 906, and/or a transmission module 908.

The reception module 904 may receive signals 910 from a wireless communication device 950 (e.g., BS 110 and/or the like). The signals 910 may include a PDCCH, a PDSCH, RRC messaging or DCI indicating a mode of the UE, information indicating a processing mode or a processing time, and/or the like. The reception module 904 may provide data 912 to the determination module 906 based at least in part on the signals 910.

The determination module 906 may determine a gap for two or more data transmissions based at least in part on a processing mode or a processing time, may determine whether a first mode (e.g., for Gap1) or a second mode (e.g., for Gap2) is to be used for the gap, and/or the like. The determination module 906 (or another module, such as the reception module 904) may provide data 914 to the transmission module 908. The transmission module 908 may transmit signals 916 to the wireless communication device 950. The signals 916 may indicate a capability of the apparatus 902, a processing time of the apparatus 902, and/or the like.

The apparatus may include additional modules that perform each of the blocks of the algorithm in the aforementioned method 800 of FIG. 8 and/or the like. Each block in the aforementioned method 800 of FIG. 8, and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 9 are provided as an example. In practice, there may be additional modules, fewer modules, different modules, or differently arranged modules than those shown in FIG. 9. Furthermore, two or more modules shown in FIG. 9 may be implemented within a single module, or a single module shown in FIG. 9 may be implemented as multiple, distributed modules. Additionally, or alternatively, a set of modules (e.g., one or more modules) shown in FIG. 9 may perform one or more functions described as being performed by another set of modules shown in FIG. 9.

Figure 10:
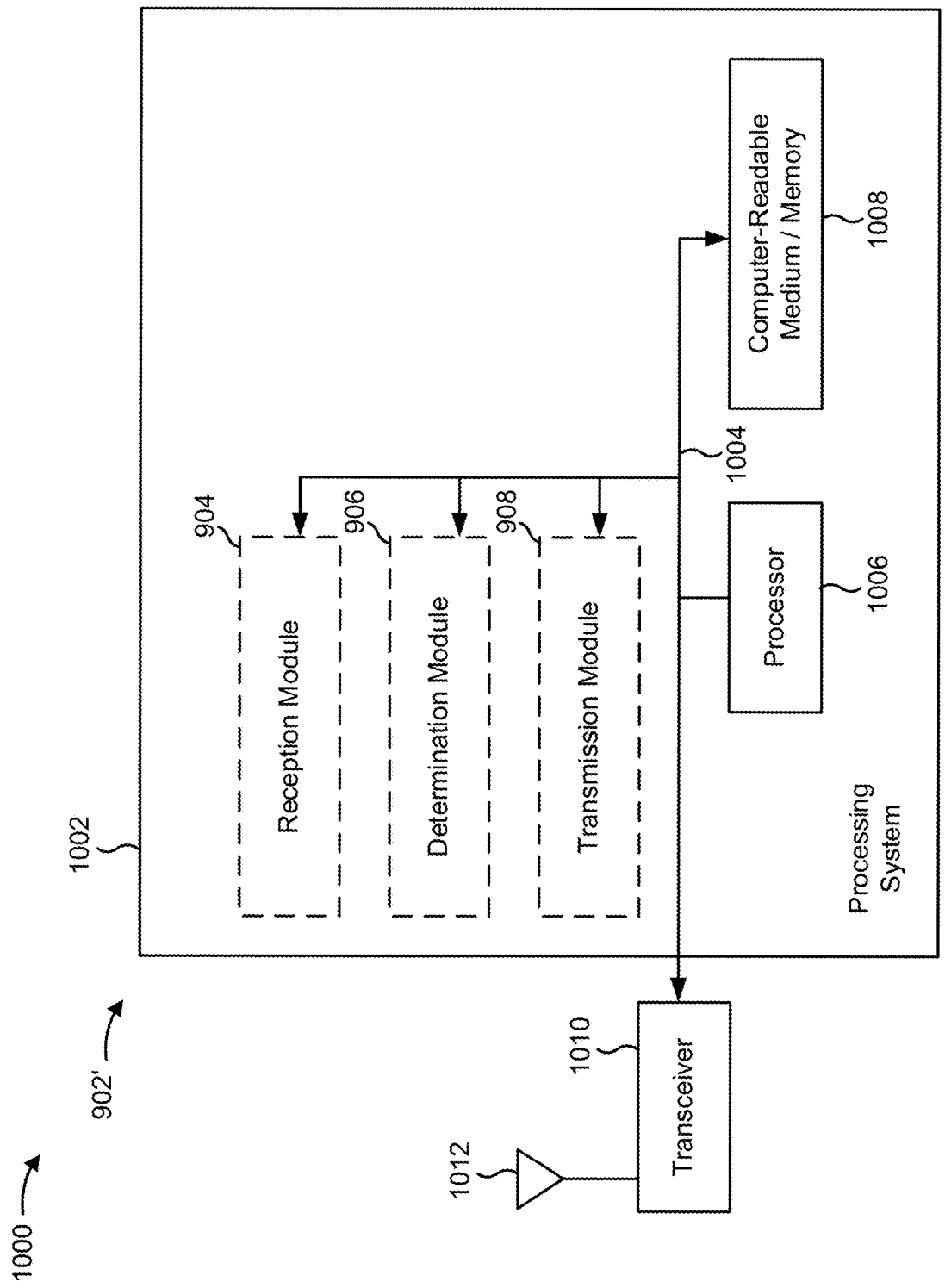
FIG. 10 is a diagram illustrating an example of a hardware implementation for an apparatus employing a processing system.

FIG. 10 is a diagram 1000 illustrating an example of a hardware implementation for an apparatus 902' employing a processing system 1002. The apparatus 902' may be a UE.

The processing system 1002 may be implemented with a bus architecture, represented generally by the bus 1004. The bus 1004 may include any number of interconnecting buses and bridges depending on the specific application of the processing system 1002 and the overall design constraints. The bus 1004 links together various circuits including one or more processors and/or hardware modules, represented by the processor 1006, the modules 904, 906, 908, and the computer-readable medium/memory 1008. The bus 1004 may also link various other circuits such as timing sources, peripherals, voltage regulators, and power management circuits, which are well known in the art, and therefore will not be described any further.

The processing system 1002 may be coupled to a transceiver 1010. The transceiver 1010 is coupled to one or more antennas 1012. The transceiver 1010 provides a means for communicating with various other apparatuses over a transmission medium. The transceiver 1010 receives a signal from the one or more antennas 1012, extracts information from the received signal, and provides the extracted information to the processing system 1002, specifically the reception module 904. In addition, the transceiver 1010 receives information from the processing system 1002, specifically the transmission module 908, and based at least in part on the received information, generates a signal to be applied to the one or more antennas 1012. The processing system 1002 includes a processor 1006 coupled to a computer-readable medium/memory 1008. The processor 1006 is responsible for general processing, including the execution of software stored on the computer-readable medium/memory 1008. The software, when executed by the processor 1006, causes the processing system 1002 to perform the various functions described herein for any particular apparatus. The computer-readable medium/memory 1008 may also be used for storing data that is manipulated by the processor 1006 when executing software. The processing system further includes at least one of the modules 904, 906, and 908. The modules may be software modules running in the processor 1006, resident/stored in the computer readable medium/memory 1008, one or more hardware modules coupled to the processor 1006, or some combination thereof. The processing system 1002 may be a component of the UE 120 and may include the memory 282 and/or at least one of the TX MIMO processor 266, the RX processor 258, and/or the controller/processor 280.

In some aspects, the apparatus 902/902' for wireless communication includes means for receiving control information that includes grants for two or more data transmissions; means for determining a gap for the two or more data transmissions based at least in part on at least one of a processing mode, a processing time of the UE, or a transmission time per data transmission the two or more data transmissions; means for receiving the two or more data transmissions in accordance with the gap; means for determining whether a first mode or a second mode is to be used for the gap, wherein the gap is to be provided between data transmissions of the two or more data transmissions in the first mode, and between a last data transmission of the two or more data transmissions and subsequent control information in the second mode; means for determining whether the first mode or the second mode is to be used based at least in part on control information or radio resource control signaling indicating whether the first mode or the second mode is to be used; means for determining whether the first mode or the second mode is to be used based at least in part on at least one of: a number of scheduled data transmissions of the two or more data transmissions, a transport block size of the two or more data transmissions, a number of repetitions of the two or more data transmissions, or a number of allocated resource units for the two or more data transmissions; and/or the like. The aforementioned means may be one or more of the aforementioned modules of the apparatus 902 and/or the processing system 1002 of the apparatus 902' configured to perform the functions recited by the aforementioned means. As described elsewhere herein, the processing system 1002 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

Figure 11:
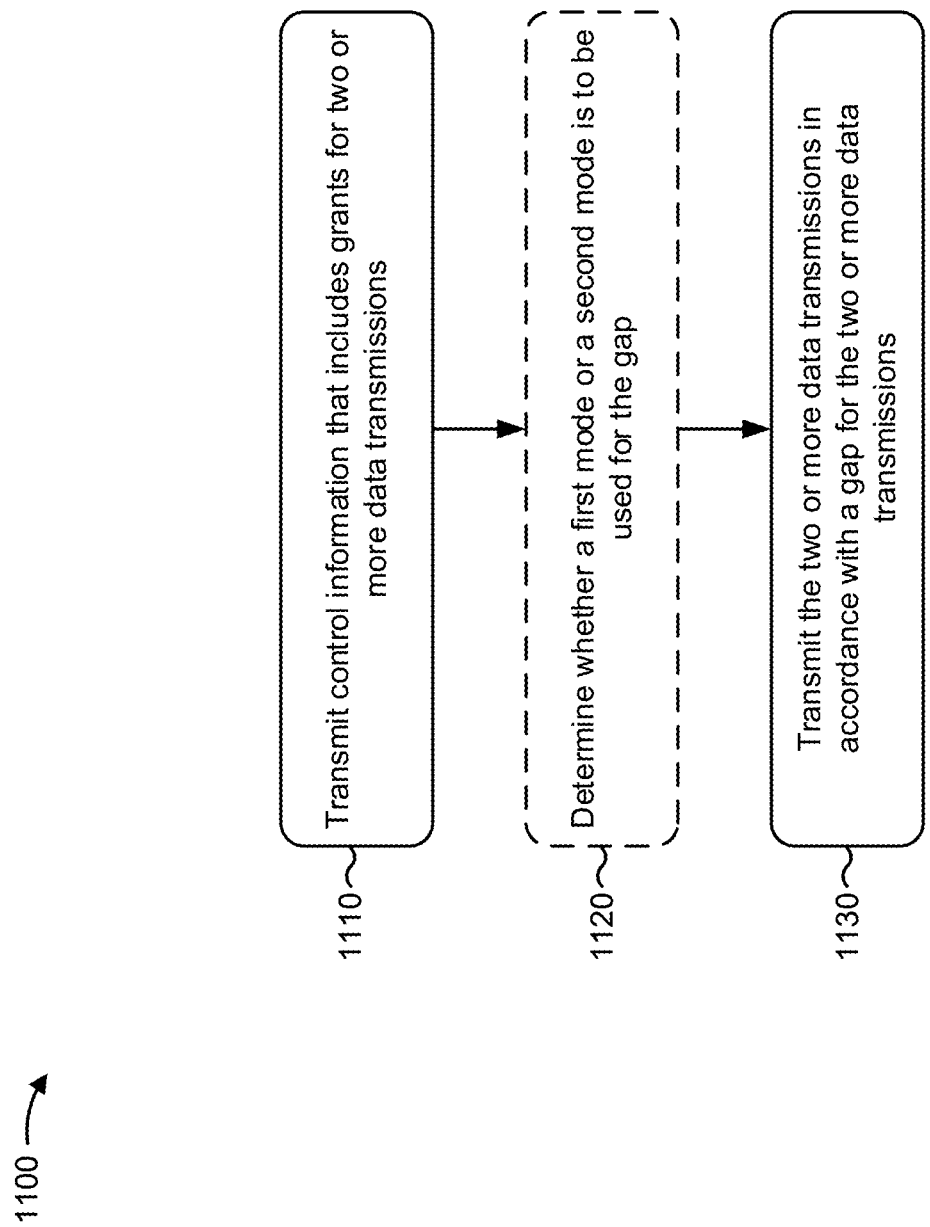
FIG. 11 is a flow chart of a method of wireless communication.

FIG. 11 is a flow chart of a method 1100 of wireless communication. The method may be performed by a base station (e.g., the BS 110 of FIG. 1, the apparatus 1202/902', and/or the like).

At 1110, the base station may transmit control information that includes grants for two or more data transmissions. For example, the base station (e.g., using controller/processor 240, transmit processor 220, TX MIMO processor 230, MOD 232, antenna 234, and/or the like) may transmit control information, such as DCI, a PDCCH, and/or the like. The control information may include grants (e.g., scheduling information) for two or more data transmissions. The two or more data transmissions may include PDSCHs, NPDSCHs, and/or the like.

At 1120, the base station may determine whether a first mode or a second mode is to be used for the gap. For example, the base station (e.g., using controller/processor 240 and/or the like) may determine whether a first mode or a second mode (or both) is to be used for the gap. The gap (e.g., Gap1) may be provided between data transmissions of the two or more data transmissions in the first mode. The gap (e.g., Gap2) may be provided between a last data transmission of the two or more transmissions and subsequent control information in the second mode. In some aspects, determining whether the first mode or the second mode is to be used is based at least in part on control information or radio resource control signaling indicating whether the first mode or the second mode is to be used. In some aspects, determining whether the first mode or the second mode is to be used is based at least in part on at least one of a number of scheduled data transmissions of the two or more data transmissions, a transport block size of the two or more data transmissions, a number of repetitions of the two or more data transmissions, or a number of allocated resource units for the two or more data transmissions. In some aspects, the gap is between a first pair of data transmissions, of the two or more data transmissions, and a second pair of data transmissions, of the two or more data transmissions.

At 1130, the base station may transmit the two or more data transmissions in accordance with a gap for the two or more data transmissions. For example, the (e.g., using controller/processor 240, transmit processor 220, TX MIMO processor 230, MOD 232, antenna 234, and/or the like) may transmit the two or more data transmissions in accordance with the gap for the two or more data transmissions (e.g., Gap1 and/or Gap2). The gap may be based at least in part on a processing mode (e.g., a batch processing mode or a real time processing mode) or a processing time (e.g., $N_0$) of the UE. In some aspects, the gap is between an end of a first data transmission, of the two or more data transmissions, and a start of a second data transmission of the two or more data transmissions. In some aspects, the gap is based at least in part on a length of a data transmission of the two or more data transmissions. In some aspects, the length of the data transmission is based at least in part on a time division duplexing (TDD) downlink/uplink (DL/UL) configuration of the recipient. In some aspects, the processing time is predefined. In some aspects, the processing mode is predefined. In some aspects, the processing mode or the processing time is radio resource control configured based at least in part on a capability of the recipient.

In some aspects, the gap is between an end of a last data transmission, of the two or more data transmissions, and an end of a control transmission candidate of a search space for a next data transmission. In some aspects, the gap is between an end of a last data transmission, of the two or more data transmissions, and an end of a first subframe of a control transmission candidate of a search space for a next data transmission.

In some aspects, the processing mode indicates to buffer one or more second data transmissions of the two or more data transmissions while a first data transmission of the two or more data transmissions is decoded. In some aspects, the processing mode indicates not to buffer one or more second data transmissions of the two or more data transmissions while a first data transmission of the two or more data transmissions is decoded. In some aspects, a size of the gap is based at least in part on a buffer size of the recipient. In some aspects, a size of the gap is based at least in part on a transport block size of the two or more data transmissions.

Although FIG. 11 shows example blocks of a method of wireless communication, in some aspects, the method may include additional blocks, fewer blocks, different blocks, or differently arranged blocks than those shown in FIG. 11. Additionally, or alternatively, two or more blocks shown in FIG. 11 may be performed in parallel.

Figure 12:
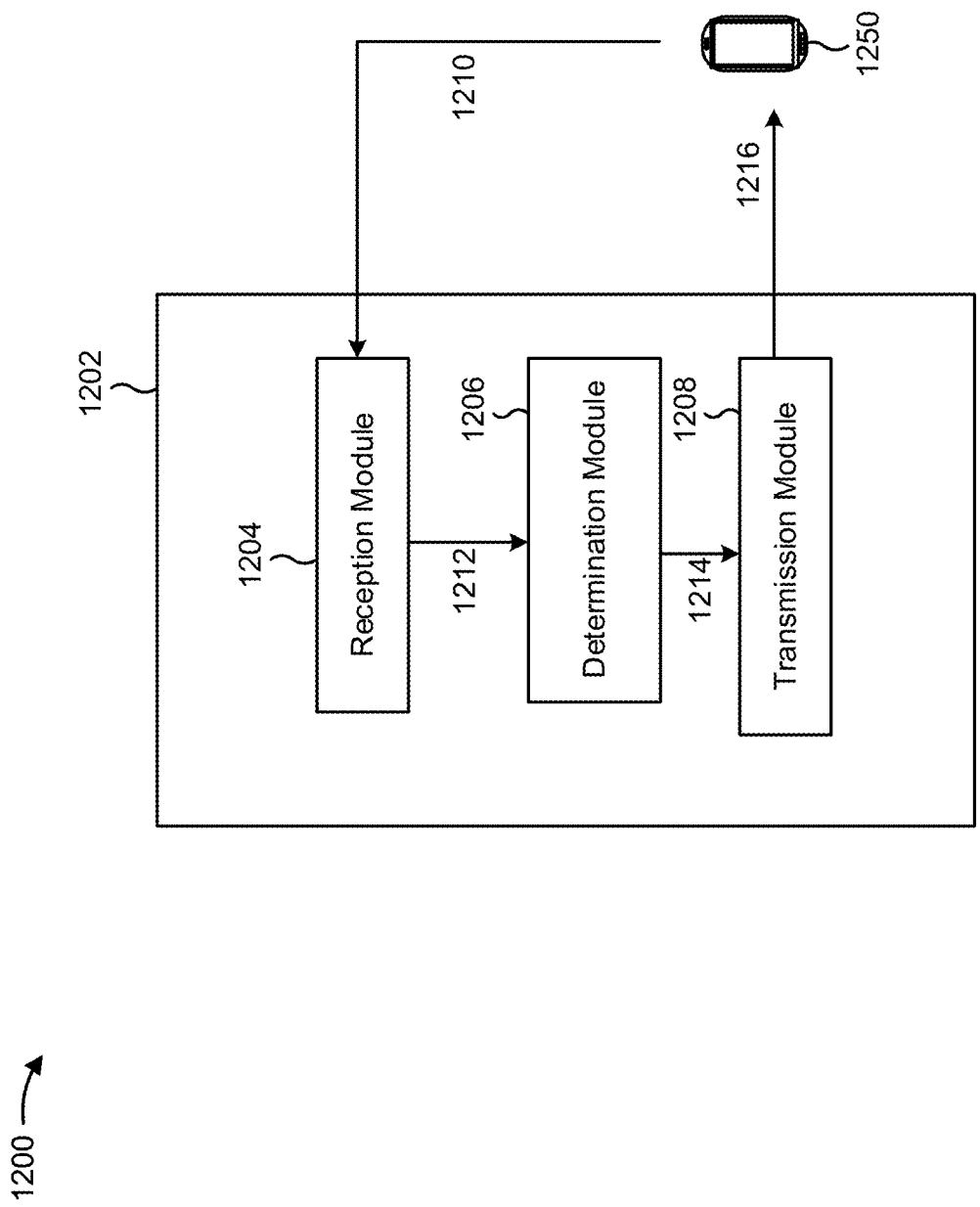
FIG. 12 is a conceptual data flow diagram illustrating a data flow between different modules/means/components in an example apparatus.

FIG. 12 is a conceptual data flow diagram 1200 illustrating a data flow between different modules/means/components in an example apparatus 1202. The apparatus 1202 may be a base station. In some aspects, the apparatus 1202 includes a reception module 1204, a determining module 1206, and/or a transmission module 1208.

The reception module 1204 may receive signals 1210 from a UE 1250 (e.g., UE 120). In some aspects, the signals 1210 may identify a capability of the UE 1250, a processing time associated with the UE 1250, a processing mode of the UE 1250, and/or the like. The reception module 1204 may provide data 1212 to the determination module 1206.

The determination module 1206 may determine a gap for two or more data transmissions, whether a first mode (e.g., Gap1) or a second mode (e.g., Gap2) is to be used for the gap, a processing mode or a processing time of the UE 1250, and/or the like. The determination module 1206 may provide data 1214 to the transmission module 1208 based at least in part on these determinations.

The transmission module 1208 may transmit signals 1216 to the UE 1250. The signals 1216 may be associated with a PDCCH, a PDSCH, RRC messaging or DCI indicating a mode of the UE 1250, information indicating a processing mode or a processing time, and/or the like.

The apparatus may include additional modules that perform each of the blocks of the algorithm in the aforementioned method 1100 of FIG. 11 and/or the like. Each block in the aforementioned method 1100 of FIG. 11, and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 12 are provided as an example. In practice, there may be additional modules, fewer modules, different modules, or differently arranged modules than those shown in FIG. 12. Furthermore, two or more modules shown in FIG. 12 may be implemented within a single module, or a single module shown in FIG. 12 may be implemented as multiple, distributed modules. Additionally, or alternatively, a set of modules (e.g., one or more modules) shown in FIG. 12 may perform one or more functions described as being performed by another set of modules shown in FIG. 12.

Figure 13:
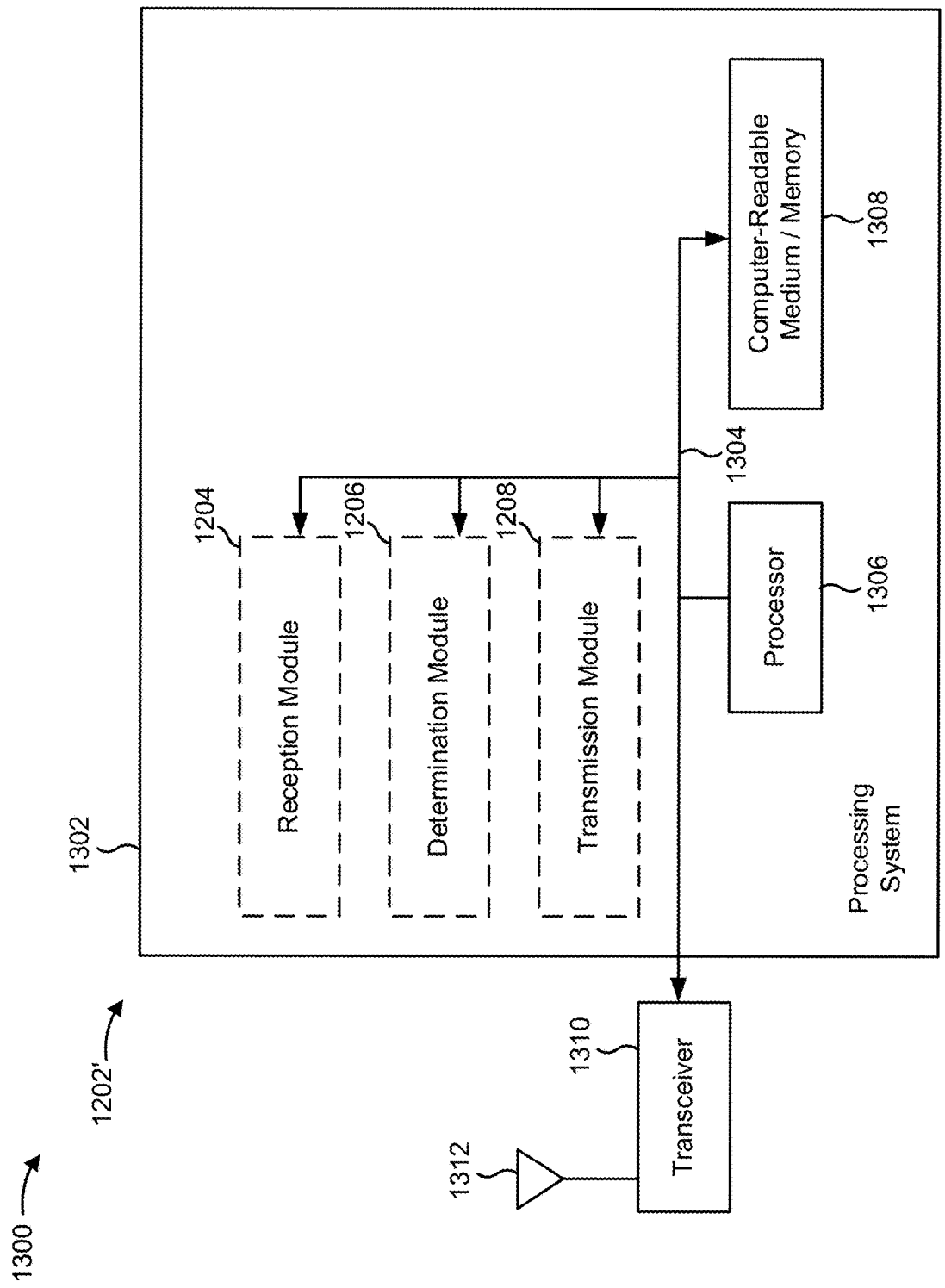
FIG. 13 is a diagram illustrating an example of a hardware implementation for an apparatus employing a processing system.

FIG. 13 is a diagram 1300 illustrating an example of a hardware implementation for an apparatus 1202' employing a processing system 1302. The apparatus 1202' may be a base station.

The processing system 1302 may be implemented with a bus architecture, represented generally by the bus 1304. The bus 1304 may include any number of interconnecting buses and bridges depending on the specific application of the processing system 1302 and the overall design constraints. The bus 1304 links together various circuits including one or more processors and/or hardware modules, represented by the processor 1306, the modules 1204, 1206, 1208, and the computer-readable medium/memory 1308. The bus 1304 may also link various other circuits such as timing sources, peripherals, voltage regulators, and power management circuits, which are well known in the art, and therefore will not be described any further.

The processing system 1302 may be coupled to a transceiver 1310. The transceiver 1310 is coupled to one or more antennas 1312. The transceiver 1310 provides a means for communicating with various other apparatuses over a transmission medium. The transceiver 1310 receives a signal from the one or more antennas 1312, extracts information from the received signal, and provides the extracted information to the processing system 1302, specifically the reception module 1204. In addition, the transceiver 1310 receives information from the processing system 1302, specifically the transmission module 1208, and based at least in part on the received information, generates a signal to be applied to the one or more antennas 1312. The processing system 1302 includes a processor 1306 coupled to a computer-readable medium/memory 1308. The processor 1306 is responsible for general processing, including the execution of software stored on the computer-readable medium/memory 1308. The software, when executed by the processor 1306, causes the processing system 1302 to perform the various functions described herein for any particular apparatus. The computer-readable medium/memory 1308 may also be used for storing data that is manipulated by the processor 1306 when executing software. The processing system further includes at least one of the modules 1204, 1206, and 1208. The modules may be software modules running in the processor 1306, resident/stored in the computer readable medium/memory 1308, one or more hardware modules coupled to the processor 1306, or some combination thereof. The processing system 1302 may be a component of the eNB 110 and may include the memory 242 and/or at least one of the TX MIMO processor 230, the RX processor 238, and/or the controller/processor 240.

In some aspects, the apparatus 1202/1202' for wireless communication includes means for transmitting control information that includes grants for two or more data transmissions; means for transmitting the two or more data transmissions in accordance with a gap for the two or more data transmissions, wherein the gap is based at least in part on a processing mode or a processing time of a recipient of the two or more data transmissions; means for determining whether a first mode or a second mode is to be used for the gap, wherein the gap is to be provided between data transmissions of the two or more data transmissions in the first mode, and between a last data transmission of the two or more data transmissions and subsequent control information in the second mode; means for determining whether the first mode or the second mode is to be used based at least in part on control information or radio resource control signaling indicating whether the first mode or the second mode is to be used; means for determining whether the first mode or the second mode is to be used based at least in part on at least one of: a number of scheduled data transmissions of the two or more data transmissions, a transport block size of the two or more data transmissions, a number of repetitions of the two or more data transmissions, or a number of allocated resource units for the two or more data transmissions; and/or the like. The aforementioned means may be one or more of the aforementioned modules of the apparatus 1202 and/or the processing system 1302 of the apparatus 1202' configured to perform the functions recited by the aforementioned means. As described elsewhere herein, the processing system 1302 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 13 is provided as an example. Other examples may differ from what is described in connection with FIG. 13.

It should be understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The above description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
   receiving control information that includes grants for two or more data transmissions;
   determining a gap for the two or more data transmissions based at least in part on at least one of a number of scheduled transport blocks or transmission time per data transmission for the two or more data transmissions,
   wherein the gap is between a first pair of data transmissions, of the two or more data transmissions, and a second pair of data transmissions, of the two or more data transmissions; and
   receiving the two or more data transmissions in accordance with the gap.

2. The method of claim 1, wherein the gap is based at least in part on a processing mode, and
   wherein the processing mode indicates to buffer one or more second data transmissions of the two or more data transmissions while a first data transmission of the two or more data transmissions is decoded.

3. The method of claim 1, wherein the gap is based at least in part on at least one of:
   a transport block size of the two or more data transmissions,
   a number of repetitions of the two or more data transmissions, or
   a number of allocated resource units for the two or more data transmissions.

4. The method of claim 1, wherein the gap is between an end of a first data transmission, of the two or more data transmissions, and a start of a second data transmission of the two or more data transmissions.

5. The method of claim 1, wherein the gap is based at least in part on a length of a data transmission of the two or more data transmissions.

6. The method of claim 5, wherein the length of the data transmission is based at least in part on a time division duplexing (TDD) downlink/uplink (DL/UL) configuration of the UE.

7. The method of claim 1, wherein the gap is based at least in part on a predefined processing time.

8. The method of claim 1, wherein the gap is based at least in part on a predefined processing mode.

9. The method of claim 1, wherein the gap is based at least in part on at least one of a processing mode or a processing time, and
wherein the processing mode or the processing time is radio resource control configured based at least in part on a capability of the UE.

10. The method of claim 1, wherein the two or more data transmissions are consecutive with each other.

11. The method of claim 1, wherein the gap is further applied between an end of a last data transmission, of the two or more data transmissions, and an end of a control transmission candidate of a search space for a next data transmission.

12. The method of claim 1, wherein the gap is further applied between an end of a last data transmission, of the two or more data transmissions, and an end of a first subframe of a control transmission candidate of a search space for a next data transmission.

13. A method of wireless communication performed by a base station, comprising:
transmitting control information that includes grants for two or more data transmissions; and
transmitting the two or more data transmissions in accordance with a gap for the two or more data transmissions, wherein the gap is based at least in part on at least one of a number of scheduled transport blocks or a transmission time per data transmission of the two or more data transmissions,
wherein the gap is between a first pair of data transmissions, of the two or more data transmissions, and a second pair of data transmissions, of the two or more data transmissions.

14. The method of claim 13, wherein the gap is between an end of a first data transmission, of the two or more data transmissions, and a start of a second data transmission of the two or more data transmissions.

15. The method of claim 13, wherein the gap is based at least in part on a length of a data transmission of the two or more data transmissions.

16. The method of claim 15, wherein the length of the data transmission is based at least in part on a time division duplexing (TDD) downlink/uplink (DL/UL) configuration of a recipient.

17. The method of claim 13, wherein the gap is based at least in part on a predefined processing time.

18. The method of claim 13, wherein the gap is based at least in part on a predefined processing mode.

19. The method of claim 13, wherein the gap is based at least in part on at least one of a processing mode or a processing time, and
wherein the processing mode or the processing time is radio resource control configured based at least in part on a capability of a recipient.

20. The method of claim 13, wherein the two or more data transmissions are consecutive with each other.

21. The method of claim 13, wherein the gap is further applied between an end of a last data transmission, of the two or more data transmissions, and an end of a control transmission candidate of a search space for a next data transmission.

22. The method of claim 13, wherein the gap is further applied between an end of a last data transmission, of the two or more data transmissions, and an end of a first subframe of a control transmission candidate of a search space for a next data transmission.

23. The method of claim 13, wherein the gap is based at least in part on a processing mode,
wherein the processing mode indicates to buffer one or more second data transmissions of the two or more data transmissions while a first data transmission of the two or more data transmissions is decoded.

24. The method of claim 13, wherein the gap is based at least in part on at least one of:
a transport block size of the two or more data transmissions,
a number of repetitions of the two or more data transmissions, or
a number of allocated resource units for the two or more data transmissions.

25. A user equipment (UE) for wireless communication, comprising:
a memory; and
one or more processors coupled to the memory, the memory and the one or more processors configured to:
receive control information that includes grants for two or more data transmissions;
determine a gap for the two or more data transmissions based at least in part on at least one of a number of scheduled transport blocks or a transmission time per data transmission for the two or more data transmissions,
wherein the gap is between a first pair of data transmissions, of the two or more data transmissions, and a second pair of data transmissions, of the two or more data transmissions; and
receive the two or more data transmissions in accordance with the gap.

26. The UE of claim 25, wherein the gap is based at least in part on a processing mode, and
wherein the processing mode indicates to buffer one or more second data transmissions of the two or more data transmissions while a first data transmission of the two or more data transmissions is decoded.

27. The UE of claim 25, wherein the gap is between an end of a first data transmission, of the two or more data transmissions, and a start of a second data transmission of the two or more data transmissions.

28. The UE of claim 25, wherein the gap is based at least in part on a predefined processing time.

29. The UE of claim 25, wherein data transmissions, of the first pair of data transmissions, are consecutive with each other without a gap therebetween, and
wherein data transmissions, of the second pair of data transmissions, are consecutive with each other without a gap therebetween.

30. A base station for wireless communication, comprising:
a memory; and
one or more processors coupled to the memory, the memory and the one or more processors configured to:
transmit control information that includes grants for two or more data transmissions; and
transmit the two or more data transmissions in accordance with a gap for the two or more data transmissions, wherein the gap is based at least in part on at least one of a number of scheduled transport blocks or a transmission time per data transmission of the two or more data transmissions,
wherein the gap is between a first pair of data transmissions, of the two or more data transmissions, and a second pair of data transmissions, of the two or more data transmissions.

* * * * *